(12) United States Patent
Shanbhag

(10) Patent No.: US 10,644,993 B2
(45) Date of Patent: May 5, 2020

(54) INTERNET REACHABILITY DETECTION AND INTERNET HIGH AVAILABILITY FOR MULTI-HOMED NETWORK DEVICES

(71) Applicant: Harman International Industries, Incorporated, Stamford, CT (US)

(72) Inventor: Sandeep Shanbhag, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 80 days.

(21) Appl. No.: 15/912,827

(22) Filed: Mar. 6, 2018

(65) Prior Publication Data
US 2019/0158386 A1 May 23, 2019

(30) Foreign Application Priority Data
Nov. 23, 2017 (IN) .............................. 201741042024

(51) Int. Cl.
| | |
|---|---|
| *H04L 12/26* | (2006.01) |
| *H04L 12/725* | (2013.01) |
| *H04L 29/12* | (2006.01) |
| *H04L 29/06* | (2006.01) |
| *H04L 12/54* | (2013.01) |

(52) U.S. Cl.
CPC ........ *H04L 45/308* (2013.01); *H04L 12/5692* (2013.01); *H04L 43/0811* (2013.01); *H04L 61/1511* (2013.01); *H04L 61/1541* (2013.01); *H04L 61/2015* (2013.01); *H04L 61/2023* (2013.01); *H04L 61/6063* (2013.01); *H04L 61/6077* (2013.01); *H04L 69/14* (2013.01)

(58) Field of Classification Search
None
See application file for complete search history.

(56) References Cited

U.S. PATENT DOCUMENTS

| | | | |
|---|---|---|---|
| 7,284,068 B1 | 10/2007 | Ramalho | |
| 2007/0058606 A1 | 3/2007 | Koskelainen | |
| 2009/0124284 A1* | 5/2009 | Scherzer | ........... H04M 1/72561 455/552.1 |
| 2012/0140651 A1* | 6/2012 | Nicoara | ................. H04W 48/18 370/252 |
| 2013/0315132 A1* | 11/2013 | Hou | ...................... H04W 88/10 370/315 |
| 2014/0280910 A1 | 9/2014 | Swig | |
| 2017/0207893 A1* | 7/2017 | Meylan | ................. H04W 28/16 |
| 2017/0280316 A1* | 9/2017 | Ashok | .................. H04W 8/183 |

* cited by examiner

*Primary Examiner* — Joshua Joo
(74) *Attorney, Agent, or Firm* — Angela M. Brunetti

(57) ABSTRACT

A method for determining Internet reachability and Internet high availability for a multi-homed device in a network having a plurality of network interfaces includes connecting the multi-homed device to a network interface of interest in the plurality of network interfaces and disabling any functionality of setting a default route entry for the at least one network interface of interest until a determination of Internet reachability is made.

18 Claims, 4 Drawing Sheets

US 10,644,993 B2

INTERNET REACHABILITY DETECTION AND INTERNET HIGH AVAILABILITY FOR MULTI-HOMED NETWORK DEVICES

CROSS REFERENCE

Priority is claimed to application serial no. 201741042024, filed Nov. 23, 2017 in India, the disclosure of which is incorporated in its entirety by reference. This application is also related to U.S. application Ser. No. 15/912,853 titled "Captive Portal Detection," filed simultaneously herewith, that claims priority to application serial no. 201741042061 filed Nov. 23, 2017 in India.

TECHNICAL FIELD

The inventive subject matter is directed to multi-homed network devices and more particularly to a method for Internet reachability detection and Internet high availability for multi-homed network devices.

BACKGROUND

A multi-home network device is a device that is simultaneously physically connected to multiple networks through multiple network interfaces such as Ethernet, Wi-Fi, Bluetooth, USB, to name a few. Examples of multi-home network devices may include, but are not limited to, network routers, bridges, switches, personal computers, laptop computers, tablets, mobile phones, and automotive infotainment units. It is possible for multi-homed devices to provide connection to the Internet through more than one of its network interfaces. For example purposes only, the description herein refers to an automotive infotainment device having Wi-Fi and Ethernet network interfaces. The infotainment device is capable of connecting to the Internet by way of two routes. By way of the Wi-Fi interface, the infotainment device may connect to an access point, such as a public, home, or office W-Fi hotspot which may connect to the Internet. By way of the Ethernet interface, the infotainment device may connect to a telematics unit on the vehicle having a modem (3G/4G) which may connect to the Internet.

While the infotainment device is capable of connecting to the Internet by way of multiple devices simultaneously, in practice, it is connected to the Internet through only one device at a time. This is due to the fact that it is standard practice for a network routing table of any network device to have a single "default" route entry, which defines the route to an Internet gateway.

There is a need for a method to detect which network interface should be used as a "default" gateway to connect a device to the Internet when multiple network interfaces are available and to offer uninterrupted Internet connectivity (high availability) when the "default" Internet gateway interface either becomes unavailable or the internet from the current default gateway goes down.

SUMMARY

A method for determining Internet reachability for a multi-homed device in a network having a plurality of network interfaces includes connecting the multi-homed device to a network interface of interest in the plurality of network interfaces and disabling any functionality of setting a default route entry for the at least one network interface of interest until a determination of Internet reachability is made. Upon determination of Internet reachability, if a default route entry does not already exist, the network interface of interest is added as the default route. If a default route entry already exists, preference configurations are applied.

The preference configurations indicate, through meeting predetermined criteria, whether or not the default route entry should be overwritten. Upon determination that there is no Internet reachability, the preference configurations are applied and, through meeting predetermined criteria, may indicate that the network interface should still be added as the default route entry. All network interface connections are monitored, either continuously or periodically, to determine Internet reachability and maintain an optimum Internet connection by way of a network interface of interest.

Figure 1:
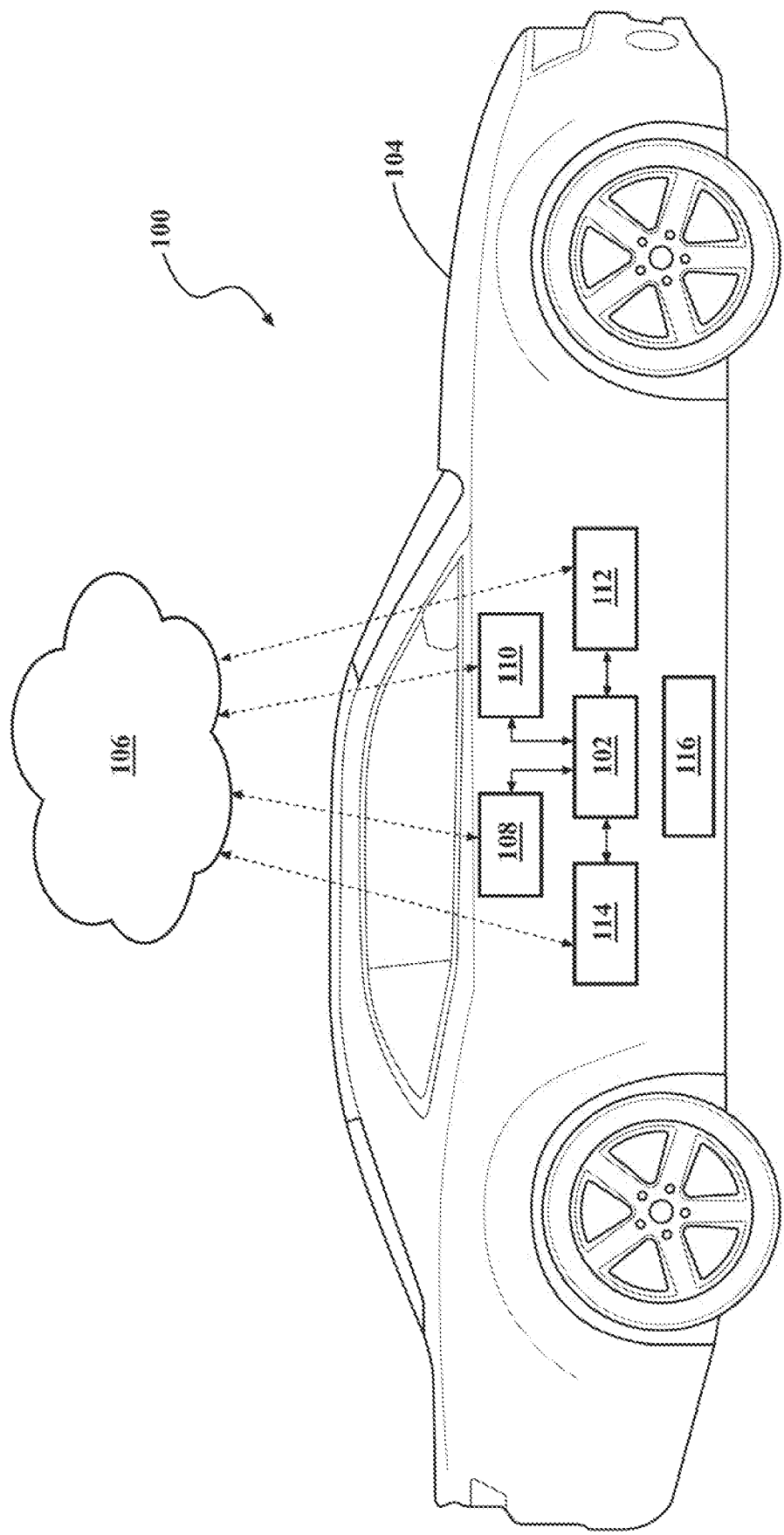
FIG. 1 is a block diagram of an exemplary multi-homed device on a vehicle having multiple network interfaces for Internet connectivity.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Any one or more of the devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 3G, 4G, 5G, USB, Bluetooth etc. One or more devices may operate using a dedicated operating system, multiple software programs and/or platforms for interfaces such as graphics, audio, wireless networking, enabling applications, integrating hardware of vehicle components, systems, and external devices such as computers, laptops, smart phones, tablets, and other systems to name just a few.

There are several points to consider when connecting a multi-homed device to the Internet. For example, a decision must be made to decide which network interface should be used. A decision must be made about when to add one of the network interfaces as the "default" gateway to the routing table. A check should be made to determine if the network interfaces are reachable to the Internet or not. Current Internet connection status should be monitored. And continuous uninterrupted Internet service should be provided when the "default" Internet gateway network interface goes down.

FIG. 1 is a block diagram 100 of an example application for a multi-homed device, such as an infotainment device 102 on a vehicle 104, having multiple network interfaces for connectivity to the Internet 106. Other examples of multi-homed devices include, but are not limited to, network routers, bridges, switches, personal computers, laptops, tablets, mobile phones, etc. The multiple network interfaces may include, but are not limited to an Ethernet interface 108, a telematics modem 110, Wi-Fi 112, a USB Dongle (3G/4G) 114. This example applies to networks where a single "default" gateway at a time for Internet connectivity is set in a routing table (not shown in FIG. 1) as managed by a network manager 116. The network manager 116 includes computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like A layer-2 connection occurs when the infotainment device 102 connects to one of its network interfaces 108-114. The device becomes part of the network. After the layer-2 connection, the device receives an Internet Protocol (IP) address, a subnet mask, a gateway IP address and a Domain Name System (DNS) Server IP address from a Dynamic Host Configuration Protocol (DHCP) server running on the network. The DHCP client running on the infotainment device 102 adds a host route corresponding to the network in the muting table. For example, for a connection by way of the Ethernet interface 19=08, an entry "10.90.14.0*255.255.0 U 1 0 0 eth0" is added to the routing table as shown below:

| Destination | Gateway | Genmask | Flags | Metric | Ref | Use | Iface |
|---|---|---|---|---|---|---|---|
| default | 10.90.14.1 | 0.0.0.0 | UG | 0 | 0 | 0 | eth0 |
| 10.90.14.1 | * | 255.255.254.0 | UG | 1 | 0 | 0 | eth0 |
| 192.168.43.0 | * | 255.255.255.0 | U | 9 | 0 | 0 | wlan0 |

In practice, the DHCP client adds this entry as a "default" route in the routing table. However, in current known practices, there is no check performed to ensure that the network interface is reachable to the Internet before adding the particular network interface as the default gateway. The problem with this is that the network interface 108 that is not reachable to the Internet may become the "default" route to the Internet. Further, in current known practices, the DHCP client does not overwrite the existing "default" route in the muting table when another network interface device, such as the telematics device 110 for example, connects to a different network.

As a result, in a multi-homed device network, if a network interface without Internet reachability connects first and takes the "default" mute slot in the routing table and another network interface with Internet reachability connects second, no change will be made to the "default" route. Therefore, the network interface 108 without Internet reachability is left as the route to the Internet merely because it was the first to connect to the network and has been set as the existing "default" route in the routing table. The result is that the multi-homed device, the infotainment device 102 in this example, is left without Internet even though at least one of its network interfaces, the telematics modem 110 in this example, is capable of Internet reachability.

Figure 2:
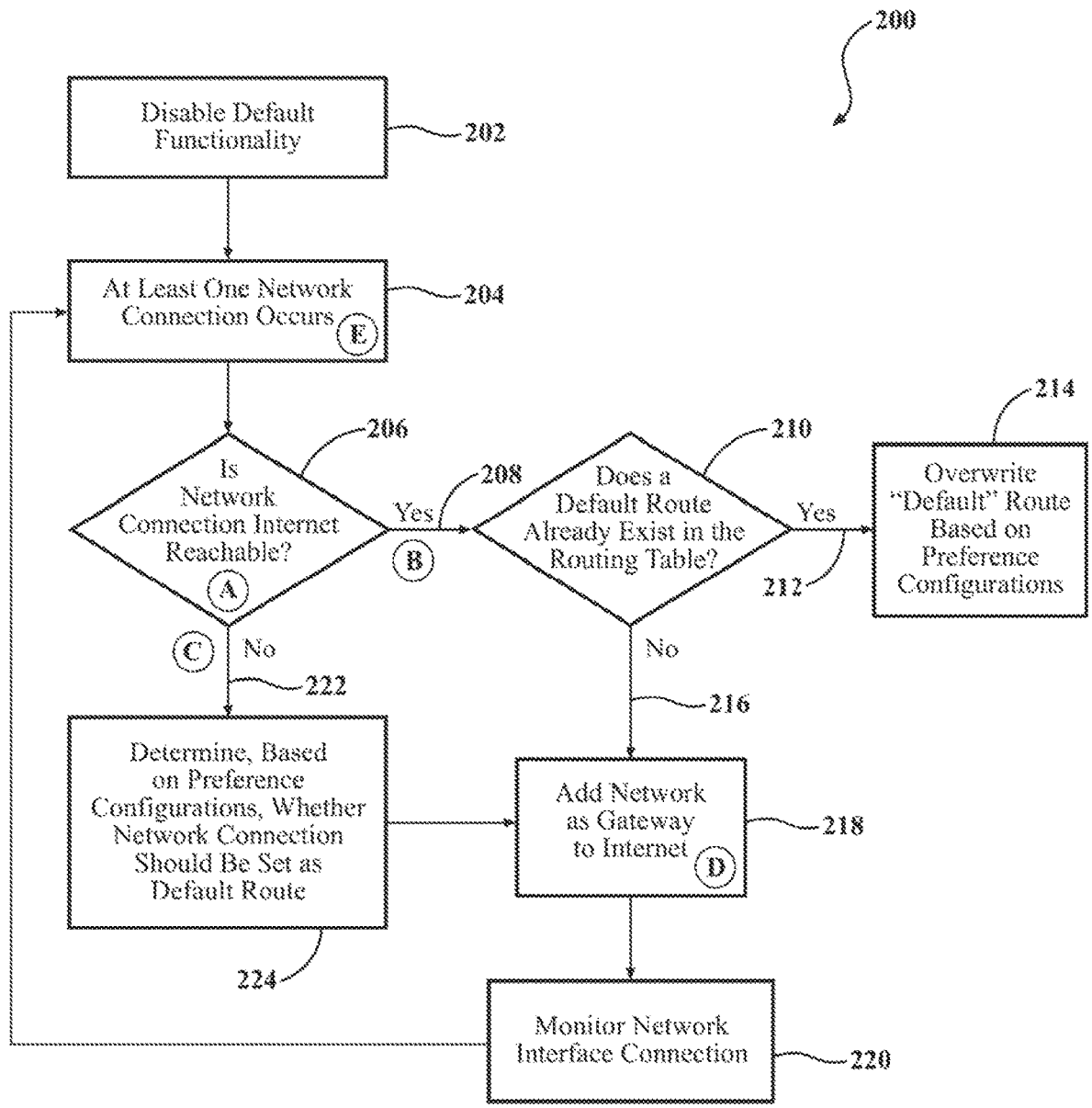
FIG. 2 a flow diagram illustrating one or more embodiments of a method for setting a default route for a network interface device.

FIG. 2 is a flow diagram for a method 200 that addresses this problem and determines whether a network interface is reachable to the Internet before adding the network interface to a routing table as a "default" Internet route. The method modifies standard DHCP Client configuration to disable 202 the functionality of adding a "default" route entry into the routing table. This leaves the routing table without a "default" route upon connection of the multi-homed device to the network by way of a network interface in order to provide an opportunity to check that the just connected network interface is Internet reachable. The just connected network interface is also referred to herein as the network interface of interest.

Upon connection 204 of the multi-homed device to the network by way of the just connected network interface, a check is made to determine if the network interface of interest is Internet reachable 206. This step will be discussed in more detail later herein with reference to FIG. 3. Still referring to FIG. 2, upon a determination that the network connection is Internet reachable the method determines if a "default" route already exists 210 in the routing table. If a "default" route already exists 212, the network manager applies preference configurations (also to be discussed in detail later herein) to determine whether the "default" route should be overwritten 214. For example, if a configuration preference indicates that an Ethernet network interface is preferred for Internet connectivity over Wi-Fi when both network interfaces are reachable to the Internet, then such a route change may be handled by the network manager.

In the event that a "default" route does not already exist 216 in the routing table, the network interface address will be added to the routing table 218 as the "default" route to the Internet. The network manager continues to monitor 220 network interface connections.

Upon determination that the network connection is not Internet reachable 222, a determination is made, based on the preference configurations, whether or not to set the network interface of interest as the "default" route 224 in the routing table. In practice it is sometimes necessary to reach another host on other networks, such as a different subnet, regardless of Internet reachability. So the network manager makes decisions on a per-network basis as to whether it is necessary to add a network interface as the "default" route even when it is not Internet reachable. In the event that preference configurations for the network indicate that the network connection should still be used, it may be set as the "default" route.

The method continues to monitor 220 network interface connections. Monitoring 220 the network interfaces provides an opportunity for detecting when the Internet is down and provides an opportunity to restore Internet connectivity by adding a network interface as the "default" route if there are no other alternative network interfaces providing Internet connectivity during a transient period. Also, if the preference configurations indicate that it is no longer necessary to reach another host on other networks making Internet reachability possible, modifications may be made to adjust the "default" route.

Figure 3:
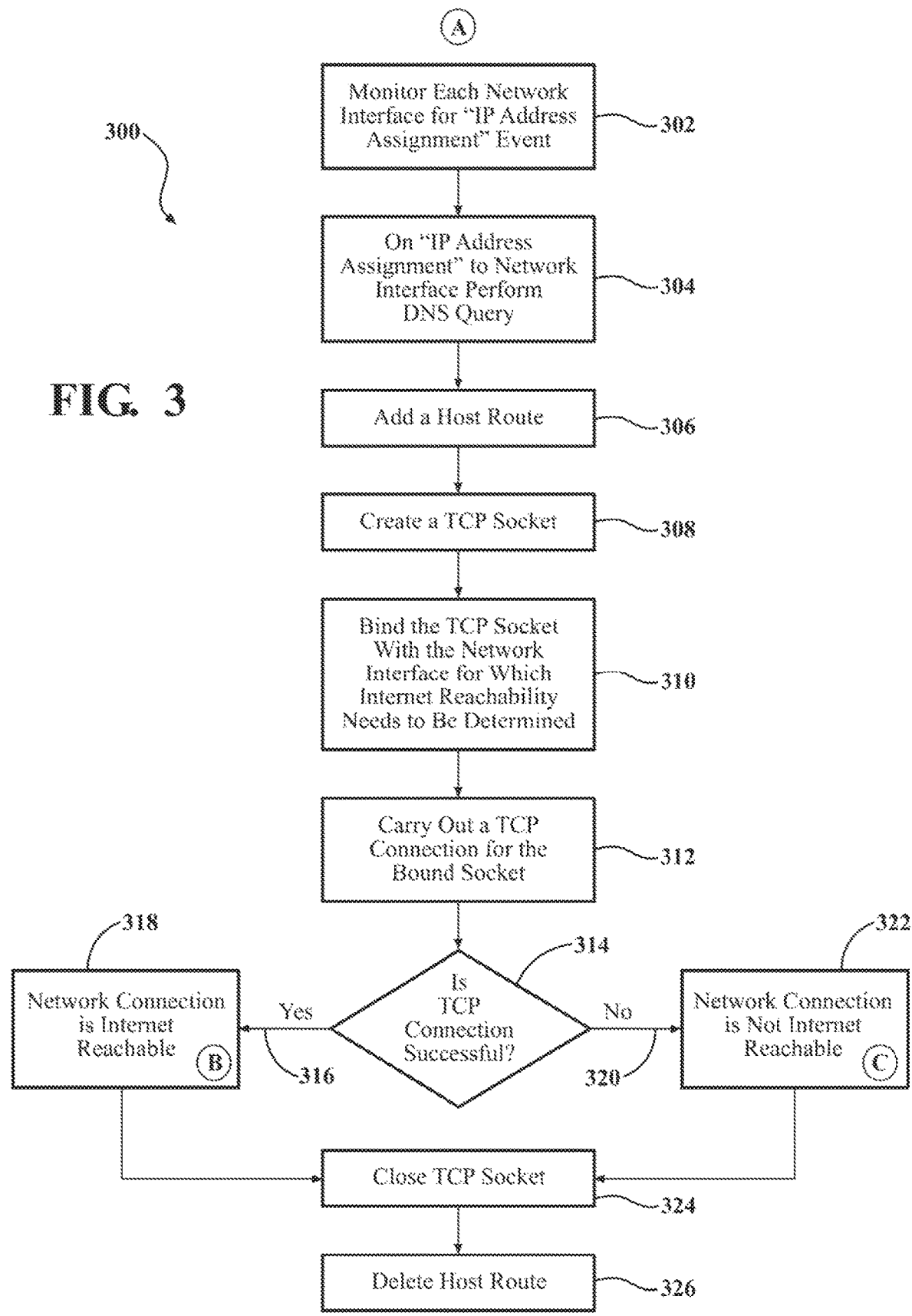
FIG. 3 a flow diagram illustrating one or more embodiments of a method for determining whether a network interface device is Internet reachable.

The step of determining whether or not a network connection for a network interface of interest is Internet reachable 206 is discussed in detail with reference to the flow diagram 300 shown in FIG. 3. In order to determine if a network connection for a network interface of interest is Internet reachable, using operating system event mechanisms, each network interface is monitored 302 for an event such as "Interface Up/Down," "IP Address Assignment", etc. Upon an "IP Address Assignment" event to the network interface of interest, a Domain Name System (DNS) query is performed 304 for more than one well known Internet website URL to obtain the websites' IP addresses. While successful DNS may be an indication that the network interface reachable to Internet, it is a reliable indicator only when the network interface of interest is the only interface connected to the network. Multi-homed devices inherently have multiple network interfaces and multiple network connections. If another network interface on the multi-homed device is already connected to the network then the DNS response may be from that network interface and not the network interface of interest, and there is no way to tell the difference. Therefore, relying only on a successful DNS response to infer that the current network interface in question is Internet reachable is not a reliable indicator of Internet reachability for the network interface in question.

To address this deficiency, the network manager adds a host route 306 with the network interface of interest's gateway received in its DHCP offer as the "default" route and the DNS resolved IP address as the destination host. For example on a Linux system a route may be added as:

```
#sudo route add-host
210.35.14.21 gw 192.168.43.1
   210.35.14.31 ==> DNS
Resolved IP address of a well-known website URL
   192.168.43.1 ==>
Gateway of the Wi-Fi network as returned in is DHCP offer from
   the DHCP Server on its
network
```

This route dictates that all traffic to the host with the destination IP address 210.35.13.31 should only go through the Wi-Fi network's gateway (192.168.43.1) by way of its Wi-Fi network interface "wlan0".

A TCP socket is created 308 and is bound 310 with the network interface of interest using a Portable Operating System Interface (POSIX) bind( ) Application Programming Interface (API). Apart from the step of adding a host route 306, the binding the TCP socket 310 ensures that any traffic on this socket exits the device only through the bound interface and not through another network interface if already present.

A TCP connection is carried out 312 for the bound socket with a destination server address (216.58.214.46) and Hypertext Transfer Protocol (HTTP) ports (80 and/or 8080). Because HTTP protocol is based on TCP, a TCP connection to a valid HTTP server on port 80 or port 8080 should be successful when the network interface is reachable to the Internet 314. Due to the addition of the host route 306 and the binding of the TCP socket to the network interface of interest 310, a known result that the TCP connection (three-way handshake) happens only through the network interface of interest for which internet reachability is being determined is guaranteed.

When the TCP connection to the remote Internet website's IP address is successful 316, a sure conclusion may be made that the particular network interface of interest is Internet Reachable 318. If a TCP connection results in an error 320, such as "errno:ENETUNREACH ("Network is unreachable")", a sure conclusion that the network interface of interest is not reachable to the Internet may be made 322.

When a conclusion has been reached, the TCP socket is immediately closed 324. The added host route is deleted 326. For example on a Linux system the host route may be deleted as # sudo route del-host 210.35.14.31 gw 192.168.43. Whether or not the network interface of interest is Internet reachable has been determined.

Referring again to FIG. 2, network interfaces which are connected at Layer-2 and Layer-3, but are not currently Internet reachable may be continuously, or periodically, monitored 220 by the network manager. A network interface may not be Internet reachable intermittently for a variety of reasons, such as lack of signal strength, geography, Internet service provider (ISP) issues, and the like. The preference configurations 214, 224 discussed above may be applied, through a network manager or the like, to determine whether or not to add a network interface as the "default" route. The preference configurations may be applied by the network manager to prioritize and select the "default" route that is most appropriate at any point in time and for any particular network interface. Examples of preferences may include, but are not limited to, transmission speed, signal strength, cost of access (4G v. Wi-Fi), etc. Such preference configurations are given weighted values based on their importance and application to the network system and are used to make policy decisions in order to implement the selection of a network interface of interest and in order to make a determination of whether or not to add the network interface as a gateway to the Internet or whether or not to overwrite the existing "default" route.

Additionally, a network interface that is not preferred may be replaced by a preferred network interface. For example, suppose 4G was providing Internet as a hotspot to which the multi-homed device was connected and ISP issues occurred. Upon ISP issues being resolved, the Internet provided through Wi-Fi returns and the continuous monitoring 220 is taking place. Taking into consideration Wi-Fi is faster and cheaper than 4G, the present method 200 may determine, based on the configuration preferences, that Wi-Fi should replace 4G as the "default" route. Using the method described herein, the network manager is provided the opportunity to make such adjustments to optimize the system and ultimately improve an end user's experience.

Figure 4:
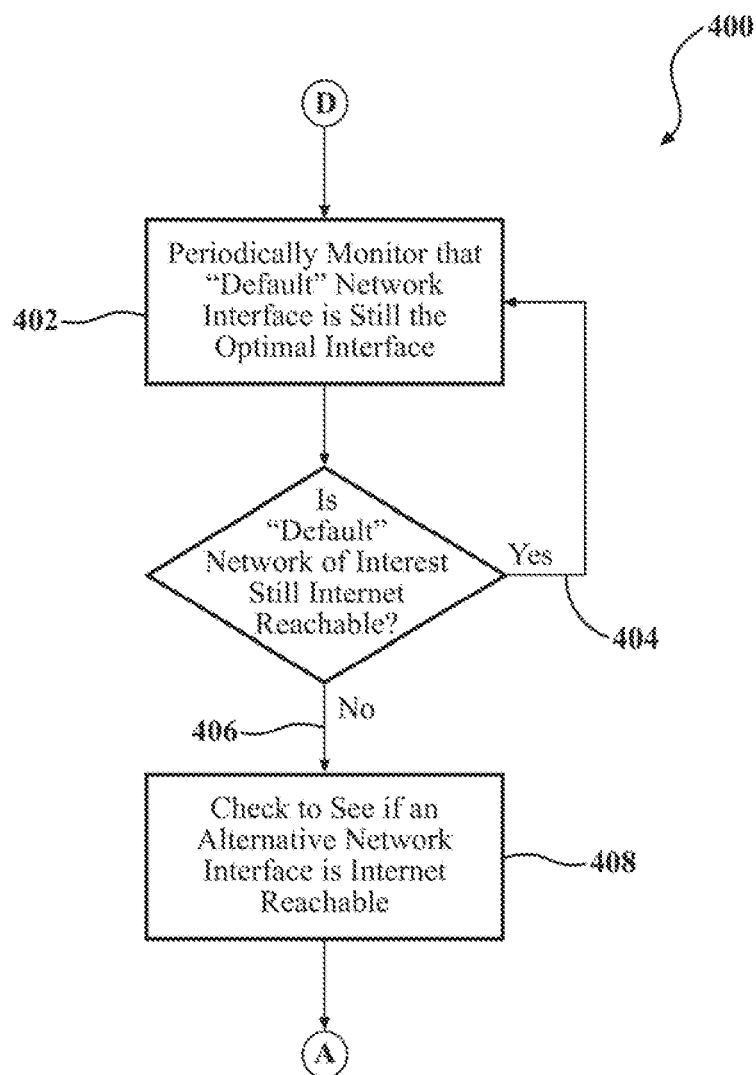
FIG. 4 is a flow diagram illustrating one or more embodiments of a method for determining Internet high availability.

Internet high availability is a factor to be considered by the network manager when decisions about adjusting the "default" route need to be made. FIG. 4 is a flow diagram 400 for a method that carries out Internet high availability. After checking the Internet reachability of a network interface and setting it as the "default" route as discussed above, the network interface of interest is periodically monitored 402 to determine if the network interface of interest is still the optimal interface to be used as the "default" route. The method described in FIGS. 2 and 3 is applied to this periodic monitoring and the network manager makes decisions based on the configuration preferences. The periodicity of Internet monitoring for the network of interest may be set as desired.

In the event that the "default" network interface of interest is still Internet reachable 404 and is still the optimal choice for interfacing the network, the periodic monitoring continues 402. In the event the "default" network interface is no longer Internet reachable 406 or is no longer the optimal choice, a check is made to determine if any other network interface is optimal and Internet reachable 408 by applying the method described in FIG. 2. Again, the determination as to which alternative network interface should replace the existing "default" network interface of interest is a policy decision based on preference configurations and the determination of Internet reachability.

Once the alternative network interface is determined, it replaces the existing "default" route which is no longer Internet reachable and/or the optimal choice for network interface. As a result uninterrupted service may be provided to an end user. The end user will not experience Internet drop outs for transient periods of get stuck with a bad network speed.

Presently there is no standard implementation for a comprehensive Internet reachability management and high availability management, so implementations across devices and operating systems (OS) vary. The methods described herein provide comprehensive Internet management and monitors high availability functionalities of multi-homed devices. Presently some implementations do not detect Internet reachability at all and blindly set a default route which leads to end user dissatisfaction due to a lack of internet connectivity. The methods described herein provide uninterruptible Internet service resulting in an enhanced user experience.

Some known methods for determining Internet reachability rely on HTTP protocol exchange which is time consuming due to protocol overhead and also requires HTTP protocol support. The methods described herein provide an opportunity to dynamically change the "default" route, or gateway, according to preference configurations which provide operating benefits such as cost savings, improved efficiencies, faster speeds, fewer dropouts, etc.

Many small embedded devices, such as Internet of Things (IOT) devices and wearables may not support HTTP protocol and therefore are not able to be used for determining Internet reachability. Smaller devices often still have TCP/IP stack. The methods described herein depend on DNS and TCP. Devices with smaller footprints and memory constraints like, IOT devices or wearables, may be used for determining Internet reachability using the methods described herein.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for determining Internet reachability for a multi-homed device in a network having a plurality of network interfaces capable of network interface connections, the method carried out by a network manager and comprising the steps of:

connecting the multi-homed device to a network interface of interest in the plurality of network interfaces;

disabling a dynamic host configuration protocol (DHCP) client functionality of setting a default route entry for the network interface of interest prior to determining Internet reachability of the network interface of interest;

determining Internet reachability of the network interface of interest;

upon determination of Internet reachability, determining whether a default route entry for the network interface of interest already exists;

when a default route entry does not already exist, adding a route entry for the network interface of interest;

when a default route entry already exists, applying preference configurations that indicate, through meeting predetermined criteria, that the default route entry should be overwritten with a route entry for the network interface of interest and overwriting the existing default route entry with the route entry for the network interface of interest;

monitoring each of the network interface connections to determine Internet reachability; and upon determination that there is no Internet reachability for the network interface of interest, applying preference configurations that indicate, through predetermined criteria, that an alternative network interface in the plurality of network interfaces is Internet reachable and should be added as a route entry overwriting the existing default route entry for providing Internet high availability.

2. The method as claimed in claim 1 wherein the step of monitoring each of the network interface connections for Internet reachability further comprises continuously monitoring all network interface connections.

3. The method as claimed in claim 1 wherein the step of monitoring all network interface connections for Internet reachability further comprises monitoring all network interface connections at predetermined intervals.

4. The method as claimed in claim 1 wherein the step of determining Internet reachability further comprises the steps of:

monitoring each network interface for an "IP Address Assignment" event;

performing a DNS query for at least two predetermined Internet website URLs;

upon receiving a successful response to the DNS query, adding a host route with the network interface of interest to reach a destination IP address for the Internet website URL resolved through the successful DNS query;

creating a TCP socket for the network interface of interest;

binding the TCP socket for the network interface of interest;

carrying out a TCP connection for the bound TCP socket to the destination IP address on HTTP port 80, HTTP port 8080, or HTTP ports 80 and 8080;

upon TCP connection to the destination IP address, setting a determination of Internet reachability or a determination of no Internet reachability for the network interface of interest;

closing the TCP socket; and deleting the added host route.

5. The method as claimed in claim 1 wherein the step of monitoring all network interface connections for Internet reachability further comprises the steps of:

applying preference configurations having predetermined criteria that indicate whether or not to overwrite an existing default route entry even when the network interface of interest has been determined not to have Internet reachability; and overwriting the existing default route entry with a route entry for the network interface of interest as the default route entry when the preference configurations meet predetermined criteria.

6. The method as claimed in claim 5 wherein the step of monitoring all network interface connections to determine Internet reachability further comprises the steps of:

monitoring each network interface for an "IP Address Assignment" event;

performing a DNS query for at least two predetermined Internet website URLs;

upon receiving a successful response to the DNS query, adding a host route with the network interface of interest to reach a destination IP address for the Internet website URL resolved through the successful DNS query;

creating a TCP socket for the network interface of interest;

binding the TCP socket for the network interface of interest;

carrying out a TCP connection for the bound TCP socket to the destination IP address on HTTP port 80, HTTP port 8080, or HTTP ports 80 and 8080;

upon TCP connection to the destination IP address, setting a determination of Internet reachability for the network interface of interest;

closing the TCP socket; and deleting the added host route.

7. A non-transitory computer readable medium comprising a program, which, when executed by one or more processors performs an operation comprising:

connecting a multi-homed device to a network interface of interest in a plurality of network interfaces;

disabling a dynamic host configuration protocol (DHCP) client functionality of setting a default route entry for the network interface of interest prior to determining Internet reachability of the network interface of interest;

determining Internet reachability of the network interface of interest;

upon determination of Internet reachability, determining whether a default route entry exists;

when a default route entry does not already exist, adding a route entry for the network interface of interest;

when a default route entry already exists, applying preference configurations that indicate, through meeting predetermined criteria, that the default route entry should be overwritten with a route entry for the network interface of interest and overwriting the existing default route entry with the route entry for the network interface of interest;

monitoring each of the network interface connections to determine Internet reachability; and upon determination that there is no Internet reachability for the network interface of interest, applying preference configurations that indicate, through meeting predetermined criteria, that an alternative network interface in the plurality of network interfaces is Internet reachable and should be added as the default mute entry overwriting the existing default route entry for providing Internet high availability.

8. The non-transitory computer readable medium as claimed in claim 7 wherein the step of monitoring all network interface connections for Internet reachability further comprises continuously monitoring all network interface connections.

9. The non-transitory computer readable medium as claimed in claim 7 wherein the step of monitoring all network interface connections for Internet reachability further comprises monitoring all network interface connections at predetermined intervals.

10. The non-transitory computer readable medium as claimed in claim 7 wherein the step of determining Internet reachability further comprises the steps of:

monitoring each network interface for an "IP Address Assignment" event;

performing a DNS query for at least two predetermined Internet website URLs;

upon receiving a successful response to the DNS query, adding a host route with the network interface of interest to reach a destination IP address for the Internet website URL resolved through the successful DNS query;
creating a TCP socket for the network interface of interest;
binding the TCP socket for the network interface of interest;
carrying out a TCP connection for the bound TCP socket to the destination IP address on HTTP port 80, HTTP port 8080 or HTTP ports 80 and 8080;
upon TCP connection to the destination IP address, setting a determination of Internet reachability or a determination of no Internet reachability for the network interface of interest;
closing the TCP socket; and
deleting the added host route.

11. The non-transitory computer readable medium as claimed in claim 7 wherein the step of monitoring all network interface connections for Internet reachability further comprises the steps of:
applying preference configurations having predetermined criteria that indicate whether or not to overwrite an existing default route entry even when the network interface of interest has been determined not to have Internet reachability; and
overwriting the existing default route entry with a route entry for the network interface of interest when the preference configurations meet predetermined criteria.

12. The non-transitory computer readable medium as claimed in claim 11 wherein the step of monitoring all network interface connections to determine Internet reachability further comprises the steps of:
monitoring each network interface for an "IP Address Assignment" event;
performing a DNS query for at least two predetermined Internet website URLS;
upon receiving a successful response to the DNS query, adding a host route with the network interface of interest to reach a destination IP address for the Internet website resolved through successful DNS query;
creating a TCP socket for the network interface of interest;
binding the TCP socket for the network interface of interest;
carrying out a TCP connection for the bound TCP socket to the destination IP address on HTTP port 80, HTTP port 8080 or HTTP ports 80 and 8080;
upon TCP connection to the destination IP address, setting a determination of Internet reachability for the network interface of interest;
closing the TCP socket; and
deleting the added host route.

13. A system for determining Internet reachability comprising:
a multi-homed device in a network having a plurality of network interfaces managed by a network manager;
the network manager having one or more processors to perform operations to:
connect the multi-homed device to a network interface of interest in the plurality of network interfaces;
disable a dynamic host configuration protocol (DHCP) client functionality of setting a default route entry for the network interface of interest prior to determining Internet reachability of the network interface of interest;
determine Internet reachability of the network interface of interest;
upon determination of Internet reachability, determining whether a default route exists;
when a default route entry does not already exist, adding a route entry for the network interface of interest as the default route entry;
when a default route entry already exists, applying preference configurations that indicate, through meeting predetermined criteria, that the default route entry should be overwritten with a route entry for the network interface of interest and overwrite the existing default route entry with the route entry for the network interface of interest;
upon determination that there is no Internet reachability, applying preference configurations that indicate, through predetermined criteria, that an alternative network interface in the plurality of network interfaces should be added as the default route entry; and
monitor each of the network interface connections to determine Internet reachability.

14. The system as claimed in claim 13 wherein the network manager performs operations to continuously monitor each network interface connections.

15. The system as claimed in claim 13 wherein the network manager performs operations to monitor each network interface connections at predetermined intervals.

16. The system as claimed in claim 13 wherein the network manager performs operations to determine Internet reachability for the network interface of interest by further performing operations to:
monitor each network interface for an "IP Address Assignment" event;
perform a DNS query for at least two predetermined Internet website URLs;
upon receiving a successful response to the DNS query, add a host route with the network interface of interest to reach a destination IP address for the Internet website URL resolved through the successful DNS query;
create a TCP socket for the network interface of interest;
bind the TCP socket for the network interface of interest;
carry out a TCP connection for the TCP socket bound to eh destination IP address on HTTP port 80, HTTP port 8080 or HTTP ports 80 and 8080;
upon TCP connection to the destination IP address, set a determination of Internet reachability or a determination of no Internet reachability for the network interface of interest:
close the TCP socket; and
delete the added host route.

17. The system as claimed in claim 13 wherein the network manager performs operations to:
apply preference configurations having predetermined criteria that indicate whether or not to overwrite an existing default route entry even when the network interface of interest has been determined to not have Internet reachability; and
overwrite the existing default route entry with a route entry for the network interface of interest when the preference configurations meet predetermined criteria.

18. The system as claimed in claim 17 wherein the network manager performs operations to monitor all network interface connections to determine Internet reachability by further performing operations to:
monitor each network interface for an "IP Address Assignment" event;

perform a DNS query for at least two predetermined Internet website URLs;
upon receiving a successful response to the DNS query, add a host route with the network interface of interest to reach a destination IP address for the Internet website URL resolved through the successful DNS query;
create a TCP socket for the network interface of interest;
bind the TCP socket for the network interface of interest;
carry out a TCP connection for the TCP socket bound to eh destination IP address on HTTP port 80, HTTP port 8080 or HTTP ports 80 and 8080;
upon TCP connection to the destination IP address, set a determination of Internet reachability or a determination of no Internet reachability for the network interface of interest;
close the TCP socket; and
delete the added host route.

* * * * *

UNITED STATES PATENT AND TRADEMARK OFFICE
CERTIFICATE OF CORRECTION

PATENT NO. : 10,644,993 B2
APPLICATION NO. : 15/912827
DATED : May 5, 2020
INVENTOR(S) : Sandeep Shanbhag It is certified that error appears in the above-identified patent and that said Letters Patent is hereby corrected as shown below:

In the Claims

Column 10, Claim 7, Line 46, replace with "reachable and should be added as the default route entry".
Column 11, Claim 12, Line 36, replace with "Internet website URLs;".
Column 11, Claim 12, Line 40, replace with "website URL resolved through successful DNS query;".

Signed and Sealed this
Third Day of September, 2024

Katherine Kelly Vidal
*Director of the United States Patent and Trademark Office*